US007010464B2

(12) United States Patent
Kuzala et al.

(10) Patent No.: US 7,010,464 B2
(45) Date of Patent: Mar. 7, 2006

(54) MOBILE HVAC CAVITY TEST DEVICE, METHOD, AND COMPUTER PRODUCT

(75) Inventors: John L. Kuzala, Ann Arbor, MI (US); Mark E. Wertham, Canton, MI (US); Robert J. Bell, Livonia, MI (US); Paul G. Horvath, West Bloomfield, MI (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 10/193,074

(22) Filed: Jul. 11, 2002

(65) Prior Publication Data

US 2003/0061866 A1    Apr. 3, 2003

Related U.S. Application Data

(60) Provisional application No. 60/307,386, filed on Jul. 25, 2001.

(51) Int. Cl.
G21C 17/00    (2006.01)
(52) U.S. Cl. ............................. 702/186; 222/1; 222/36; 222/37; 702/45; 73/37; 73/863.02
(58) Field of Classification Search ................. 702/12, 702/30–33, 44–47, 50, 55, 98, 100, 106, 702/118, 126, 182, 183, 186, 188, FOR 12–128, 702/FOR 134–137, FOR 155, FOR 170–171; 222/1, 14, 36, 37, 63, 55; 73/1.16, 1.35, 73/19.04, 19.05, 23.24, 30.03, 53.04, 54.07, 73/54.13, 61.64, 61.73, 862, 323, 152.18, 73/152.21, 152.22, 152.29, 861, 863.02
See application file for complete search history.

(56) References Cited

U.S. PATENT DOCUMENTS

| | | | |
|---|---|---|---|
| 4,030,351 A * | 6/1977 | Smith | 73/118.1 |
| 4,078,421 A | 3/1978 | Gastaldo et al. | |
| 4,575,807 A | 3/1986 | Dodge | |
| 4,587,619 A | 5/1986 | Converse, III et al. | |
| 4,589,279 A * | 5/1986 | Mitsuyasu et al. | 73/118.2 |
| 4,776,206 A * | 10/1988 | Armstrong et al. | 73/40 |
| 4,942,758 A | 7/1990 | Cofield | |
| 5,343,761 A * | 9/1994 | Myers | 73/861.73 |
| 5,377,112 A * | 12/1994 | Brown et al. | 701/115 |
| 5,544,079 A * | 8/1996 | Saikalis | 702/86 |
| 5,695,092 A * | 12/1997 | Schrandt | 222/1 |
| 5,859,360 A * | 1/1999 | Magni et al. | 73/19.05 |
| 6,044,643 A * | 4/2000 | Ittner et al. | 60/289 |
| 6,151,549 A * | 11/2000 | Andrews et al. | 701/115 |
| 6,161,422 A * | 12/2000 | Thomas et al. | 73/38 |
| 6,196,056 B1 * | 3/2001 | Ewing et al. | 73/40.7 |
| 6,280,408 B1 * | 8/2001 | Sipin | 604/65 |
| 6,467,359 B1 * | 10/2002 | Atwood | 73/863.63 |
| 6,470,732 B1 * | 10/2002 | Breton | 73/23.31 |
| 6,546,818 B1 * | 4/2003 | Taylor et al. | 73/863.03 |
| 2002/0069022 A1 * | 6/2002 | Fincke | 702/45 |
| 2002/0157455 A1 * | 10/2002 | Sagi et al. | 73/40 |
| 2002/0198668 A1 * | 12/2002 | Lull et al. | 702/45 |

\* cited by examiner

*Primary Examiner*—Carol S. W. Tsai

(57) ABSTRACT

A mobile testing apparatus, method, and computer product that performs high speed testing of mobile pressure devices using high speed totalization, where testing of multiple devices may be done concurrently. Test results are communicated to a central console using a variety of communication methods, including wireless, and the testing apparatus and method is robust and reliable despite the occurrence of transient communication failures, because the test apparatus and method may operate independently of central control.

10 Claims, 17 Drawing Sheets

MOBILE HVAC CAVITY TEST DEVICE, METHOD, AND COMPUTER PRODUCT

CROSS REFERENCE TO RELATED APPLICATIONS

This application claims the benefit of the earlier filing date of U.S. provisional patent application Ser. No. 60/307,386, filed Jul. 25, 2001, the entire contents of which are incorporated herein by reference.

BACKGROUND OF THE INVENTION

1. Field of the Invention

The present invention relates to cavity pressure testing and particularly to HVAC testing of pressurized cavities in an assembly line environment.

2. Discussion of the Background

HVAC testing is widely employed in the manufacture of automotive vehicles which contain numerous vacuum and pressurized cavities throughout the structure of the vehicles, for example, air conditioning systems and engine systems. The efficient production of high-quality vehicles requires that the vacuum or pressurized systems be tested on the assembly line while the vehicles are being assembled. Because both accuracy and speed are required in this environment, manufacturers generally rely on automated test systems.

Among the systems employed by manufacturers for HVAC testing are pressure decay systems, differential pressure decay systems flow meter systems (mass flow rate systems), and totalization of flow (mass flow totalization) systems.

A disadvantage of pressure decay systems is that the cavities or pressure lines to be tested must be first evacuated in order to perform the test, and further, the systems must be tested in the absence of pressurized flow. Pressure decay systems are limited to small cavities and are affected by temperature, pressure, and humidity. Differential pressure decay systems are limited to large cavities and are also affected by temperature, pressure, and humidity. Pressure decay systems report only estimated flow rate.

A disadvantage of the flow meter systems is that the test cycle time tends to be too long to be practical in a modem vehicle assembly line environment, where the target time for testing is approximately 45 seconds. Flow meter systems typically have cycle times of approximately 90 seconds. Mass flow rate systems are affected by humidity, cavity temperature, excessive cycle duration, and are limited to measuring large cavities.

Totalization of flow test systems overcome many of the disadvantages of the above systems. In background art systems which use the totalization of flow principle, a central processor controls test heads which are moved up and down the assembly line and attached to various test points on the vehicles being assembled. Background art test systems utilize test heads that are connected to the central processor via cable connections. A disadvantage, as recognized by the present inventors, of using test heads connected with cables is that moving the test heads from vehicle-to-vehicle is constrained by the length of the cable, and further, the number of test heads that may be attached to a vehicle may be limited because of the difficulty of placing the test heads which are encumbered by the attached cables.

The repeatability of test results of a system investigating a specified cavity is dependent on a number of factors including but not limited to atmospheric pressure, atmospheric temperature, atmospheric humidity, cavity material temperature, and cavity material thermal transfer rate. Using empirical formulas, exact results are achieved when all of these parameters are monitored and included in the methods for determining cavity integrity. However, the level of cost associated with this type of system is inappropriate for typical testing conditions.

SUMMARY OF THE INVENTION

The present invention has been made in view of, and addresses, the above-mentioned and other problems.

The present invention advantageously provides a novel totalization of flow test system which features mobile test heads which communicate with a central processing system by way of wireless links. The present inventors have recognized that, in order for test systems which work in real-time to function reliably using relatively unreliable wireless links, the test heads themselves must be intelligent enough to carry on test procedures independently of the central processor. To accomplish this end, the present invention utilizes software algorithms and advanced processing capabilities which reside on the test head and which allow for the reliable testing of HVAC cavities independently from the central control system, and for the reliable transfer of commands and test results between the central control processor and the mobile test heads.

To resolve the issue of repeatability, typical testing conditions were observed and the present invention was designed with an "all things being equal" type of approach. Making assumptions as to the stability of temperature, pressure and temperature and utilizing temperature and pressure compensated mass flow meters, the present invention ensures repeatable results with nominal error.

In the present invention, during data acquisition, real-time microprocessor based operations monitor and perform calculations to determine cavity integrity. The present invention performs this integrity check as quickly as possible. In attempting to optimize the integrity algorithms and data sampling accuracy, a trade off is necessary for single microprocessor based systems. To resolve this issue, the present invention uses multiple microprocessors. The primary microprocessor receives information from the secondary processors reporting cavity volume. This approach segregates processing and effectively implements a true multi-tasking environment. Using this approach, the present invention is also very robust in terms of maintaining data integrity throughout a testing process. The secondary microprocessors maintain the information locally until the primary processor has acquired and acknowledge data transfer. This is particularly important for systems that require mobility of the testing device and where interruptions in network traffic may occur. The present invention operates effectively when only 5% of successful network transmissions are present.

The present invention evaluates a specified cavity for integrity. Acceptable integrity determination is performed via microprocessor-based evaluation of user definable parameters sets ("recipes") against realtime performance characteristics of the tested cavity.

The present invention is engineered to function in harsh environments and is capable of sustaining and maintaining performance under highly industrial environments including, but not limited to, manufacturing plants, lab environments, foundries, etc.

The present invention operates using microprocessor technology in a distributed topology. The testing devices incorporate networking protocols to achieve data migration and reside remote to the primary console. The remote systems perform mass flow totalizing during specified mode conditions. Parameters for integrity validation are transferred to the primary console via network protocols.

Standardized database interfaces are used to manage testing parameters. These parameters are interfaced to the primary console. These parameters include, but are not limited to, the following: assembly identification, testing method, mode count, and the necessary testing parameters to thoroughly evaluate the tested cavity. The present invention cycles through selected modes to perform specific tests to determine the integrity of the cavity. If a compromise in integrity is detected, the present invention generates a report with an appropriate diagnostic message to assist the operators in determining problematic areas.

Two advantageous features of the present invention are:

1) The ability to perform high speed totalizing of the mass flow signals. Background art devices have been evaluated as inadequate and inaccurate due to their inability to accurately capture the primary inrush of the flow signals. The mass flow totalizing performed by the remote microprocessors achieves the speed and accuracy necessary to provide a robust system for industrial applications;

2) The ability to evaluate the volume of a cavity. Background art devices simply determine if the cavity has an unacceptable or excessive orifice where molecular migration can occur. The present invention not only determines molecular migration, but also offers advanced diagnostics as to where the failure in integrity may be located.

The area of isolating environmental fluctuations from adversely affecting the test result have been significantly improved upon. Also, the area of reported results has been improved to provide more information and a higher level of diagnostics.

Features of the present invention include: (a) Utilization of a Voltage to Frequency Converter to change Mass Flow signal into a frequency signal allowing resolutions of 0.01 cc; b) Utilization of a microprocessor-based frequency totalizing module local to the testing station; c) Utilization of a programmable Pressure/Vacuum regulator to perform soft start to prevent over metering of the mass flow transmitter; and d) Utilization of software algorithms to determine common areas of failures.

According to an exemplary embodiment of the present invention, the central test system receives product information and recipe information from an application layer. The central test system derives acceptance parameters which are transferred from mobile test heads located at test points of vehicles being processed through an assembly line. The transfer of commands and parameters is done over wireless links employing the Ethernet protocol. A processor in the test head executes software algorithms which perform the totalization of a flow test procedure for a target cavity and transmits the results via the wireless links to the central control system.

The potential applications for use of this invention include, but are not limited to, the following: Engine Block Testing; Checking to Hold Pressure Gas Tank Testing; Checking to Hold Pressure; HVAC Plenum Testing; Checking Vacuum System; Headlight Lens Testing; Checking Watertight components; and testing any cavity that is intended to be sealed or nearly sealed with acceptable permeations.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
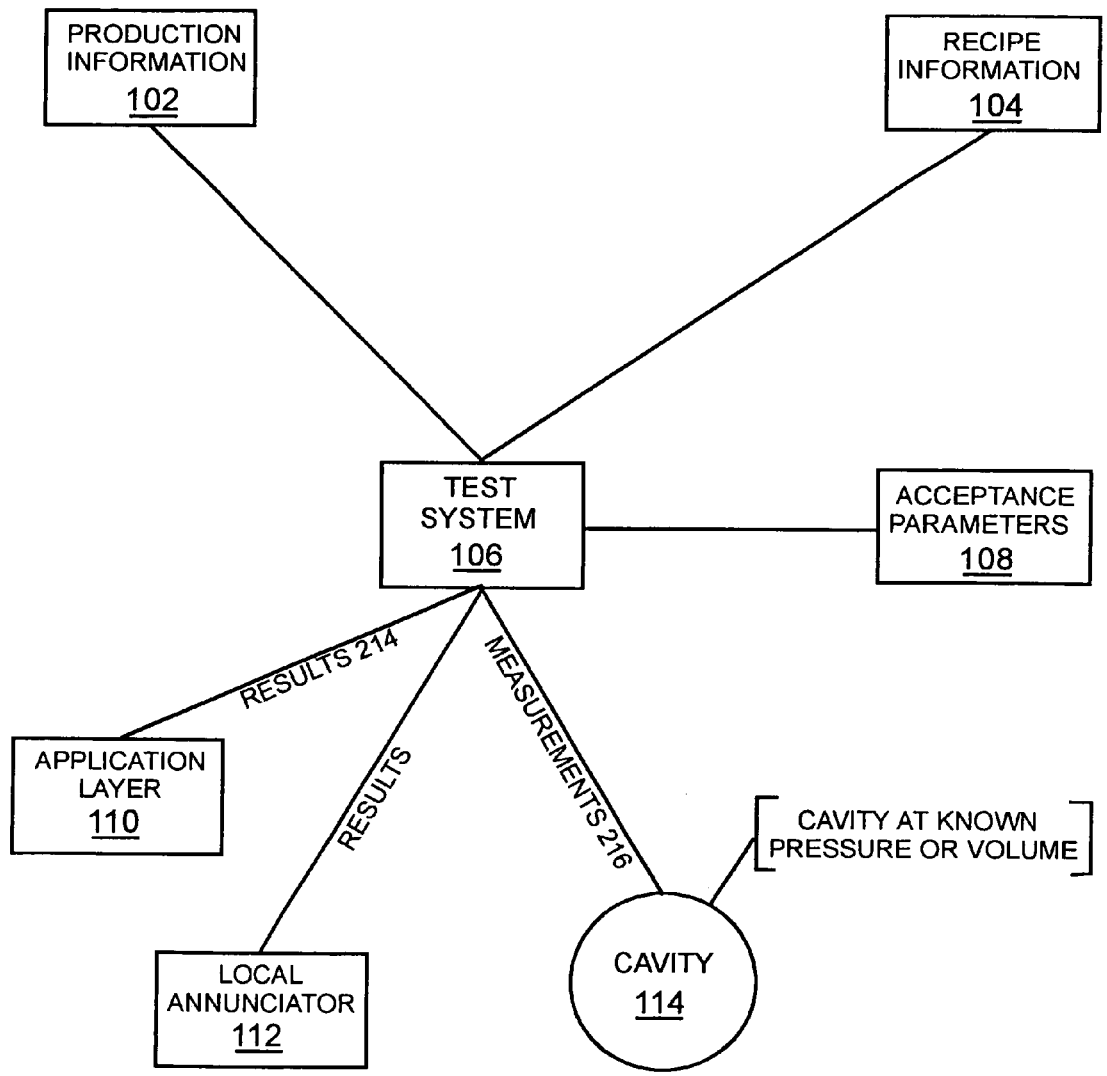
FIG. 1 is a block diagram illustrating an example of components and data flows of the present invention.

Referring now to the drawings, wherein like reference numerals designate identical or corresponding parts throughout the several views, FIG. 1 is a block diagram illustrating an example of the Test System 106 according to the present invention. The Test System 106 receives production information 102 and recipe information 104 from outside applications. Test System 106 conducts measurements 216 on cavity 114 which contains a volume of air at a known pressure or volume. The volume of air is compared against acceptance parameters 108 and the tested cavity is accepted or rejected. The result of the test is sent to outside applications 110 or to local enunciation devices 112.

Figure 2:
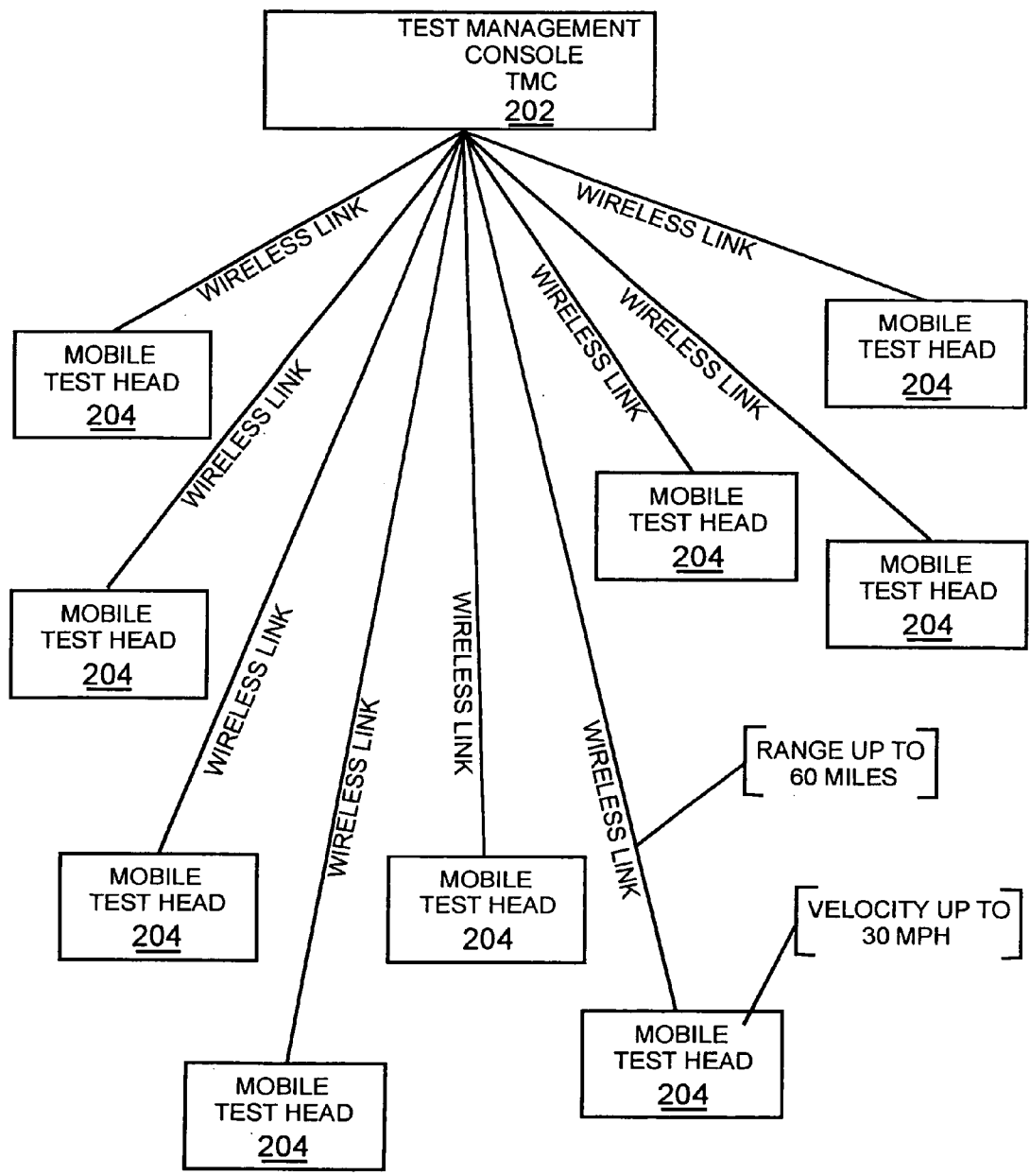
FIG. 2 is an example of a test management console and multiple mobile test heads interconnected with wireless links according to the present invention.

FIG. 2 is a block diagram illustrating an example of Test Management Console 202 communicating via wireless links with to up to 9 mobile test heads 204, where each mobile test head 204 may conduct an independent test simultaneously with tests performed by other mobile test heads. Each of the test heads 204 communicate with the Test Management Console 202 via a wireless Ethernet, allowing the test heads to be mobile (speeds up to 30 m.p.h.) and to be positioned to up to 60 miles from the Test Management Console 202. The Mobile Test Heads 204 have the capability of performing leak detection on the same cavity while the cavity undergoes multiple test mode changes. Totalizing of evacuating error is performed for each mode change for recipe comparison.

Figure 3:
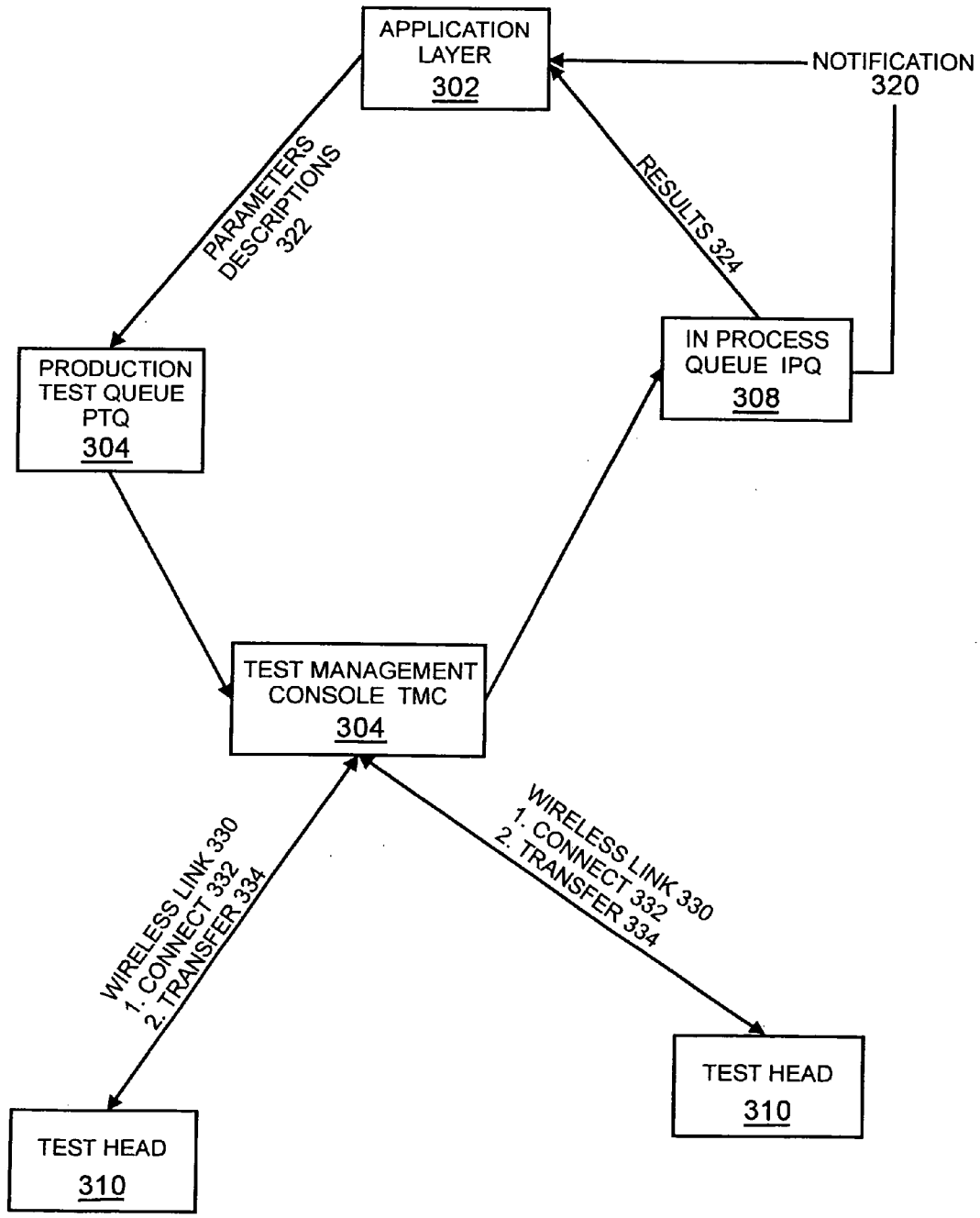
FIG. 3 is an example of process flow between the application layer and the test management console according to the present invention.

FIG. 3 is a block diagram illustrating an example software sequence of the present invention. The Test Management Console 306 maintains a Production Test Queue (PTQ) 306 local to the system. The Production Test Queue will queue information pushed down from the middle tier of the application layer 302. This information contains all of the necessary Parameters and Descriptions 322 for test performance and test result reporting. The Test Management Console 306 monitors the Production Test Queue 304 and responds to new information. When there is an item in the Production Test Queue 304, the top item waits for a new connection to a test head 310. Once the connection 332 is made over a wireless link 330, the testing information 334 is transferred to the respective Test Head 310. The Production Test Queue 304 top item is transferred to a local In Process Queue (IPQ) 308. A testing sequence is performed and a test result is written to the In Process Queue record 308. The In Process Queue is managed by waiting for a test result on the top item in the queue. When a test result is received, the In Process Queue sends a notification 320 to the Middle Tier Application 302 that Results 324 are available for extraction.

Figure 4:
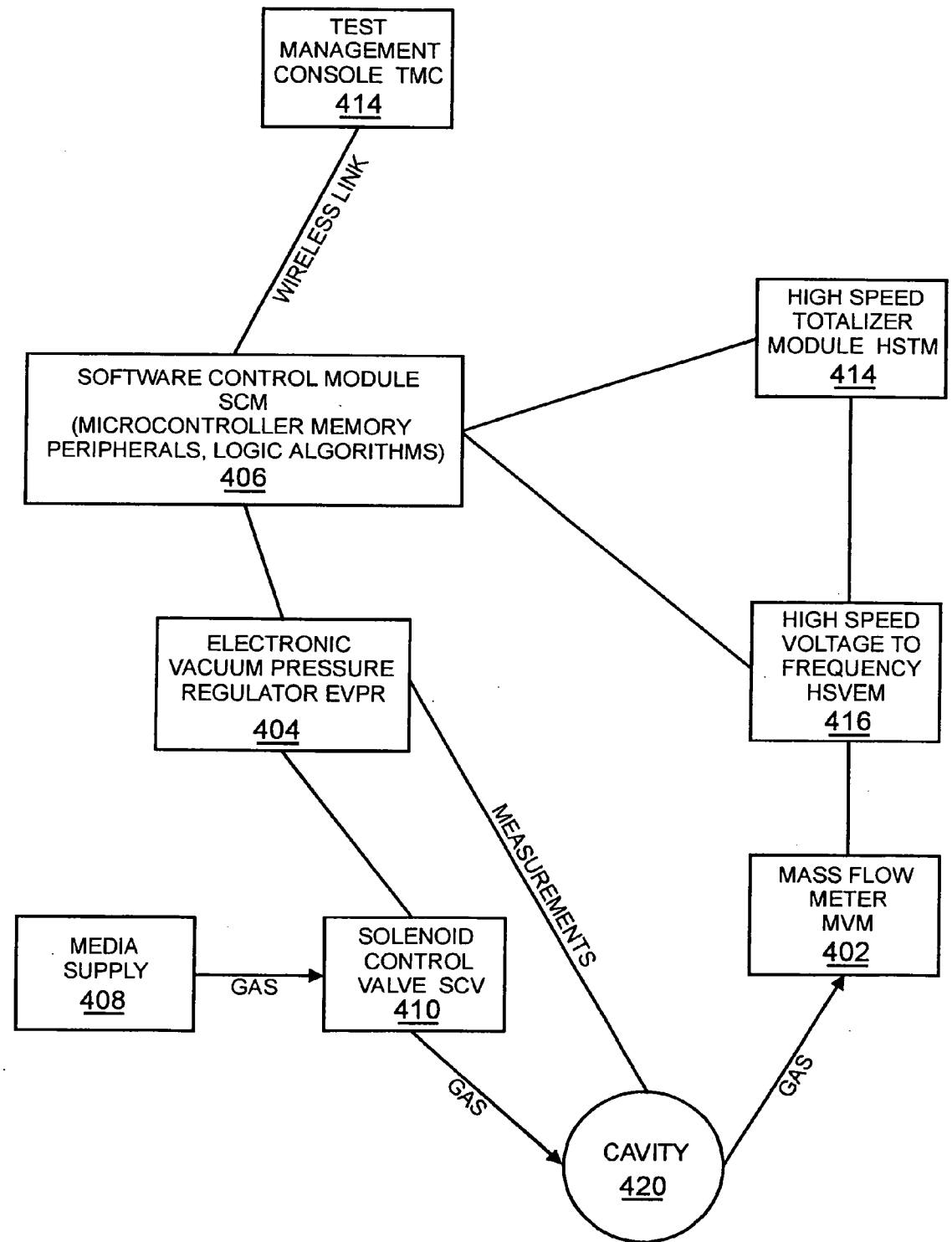
FIG. 4 is an block diagram illustrating an example process flow at the mobile test head according to the present invention.

FIG. 4 is a block of diagram illustrating an example hardware configuration of an exemplary mobile test head according to the present invention. Media (i.e. air, helium, oxygen, etc.) 408 will be evacuated from or pumped into a cavity 420 as required for the particular application. The method of media management is supplied from an outside source. The media monitoring circuit includes the following: Electronic Vacuum or Pressure Regulator (EVPR) 404; on/off Solenoid Controlled Valve (SCV) 410; thermal type Mass Flow Meter (MFM) 402; High-Speed Voltage to Frequency Module (HSVFM) 416; a High-Speed Totalizing Module (HSTM) 414; and a Software Control Module (SCM) 406, including a micro controller, volatile and non-volatile memory containing software programmed with the test head testing sequence and communication algorithms.

The media is regulated via the EVPR 404. EVPR 404 has a level set point that is determined by the software control module (SCM) 406. Flow through the system is controlled via the SCV 410. Flowing media is directed through the MFM 402. The flow rate signal is generated and sent to the HSVFM 416. The HSVFM 416 processes the flow meter signal every 50 milliseconds. The frequency signal is sent to the HSTM 414, which is capable of sampling at 10 KHz. Information from the HSTM, and all control Input and Output, is sent via wireless Ethernet to the TMC 440.

Figure 5:
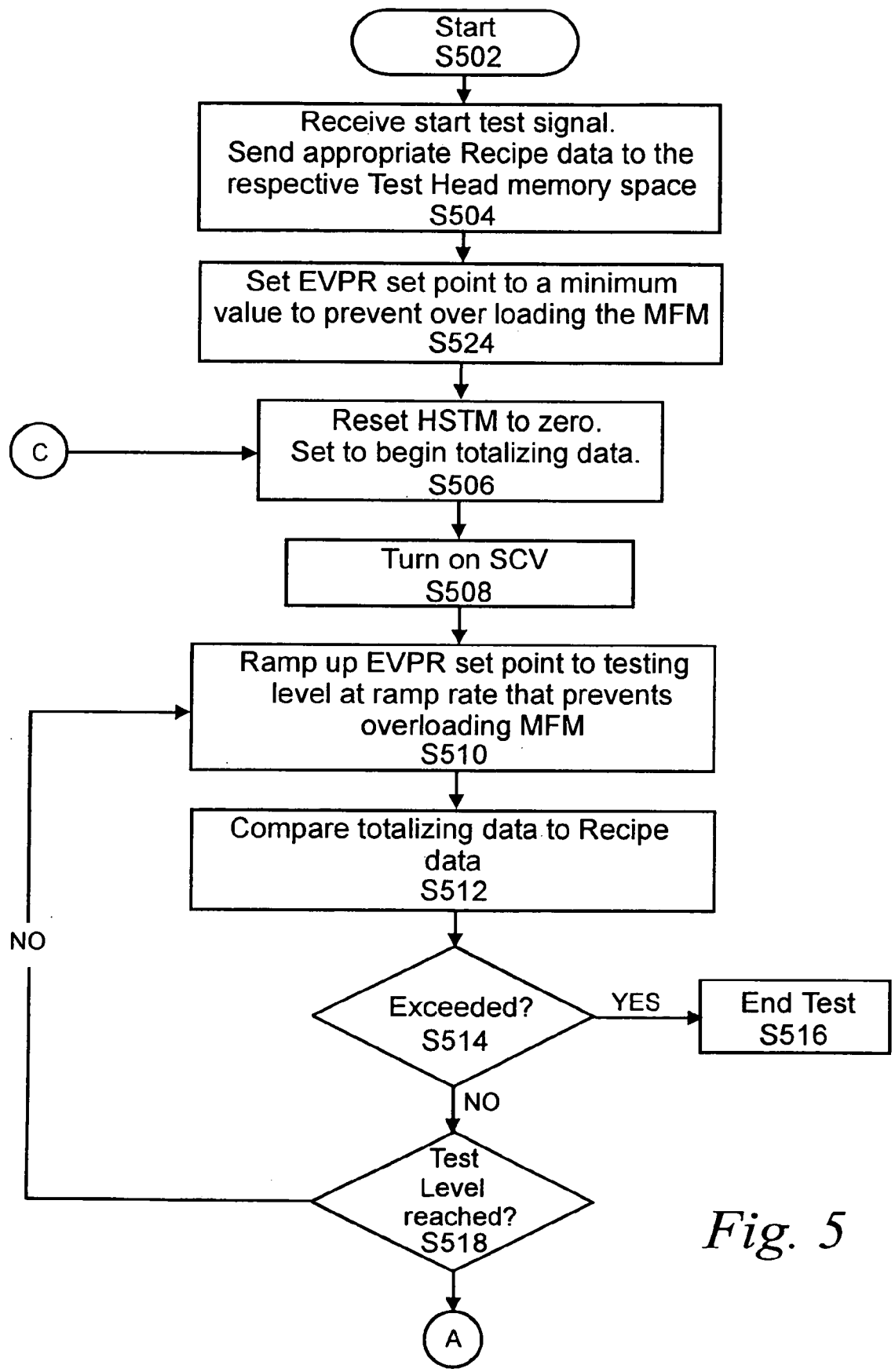
FIGS. 5–7 are an example of flow charts illustrating an example test head testing sequence according to the present invention.
Figure 6:
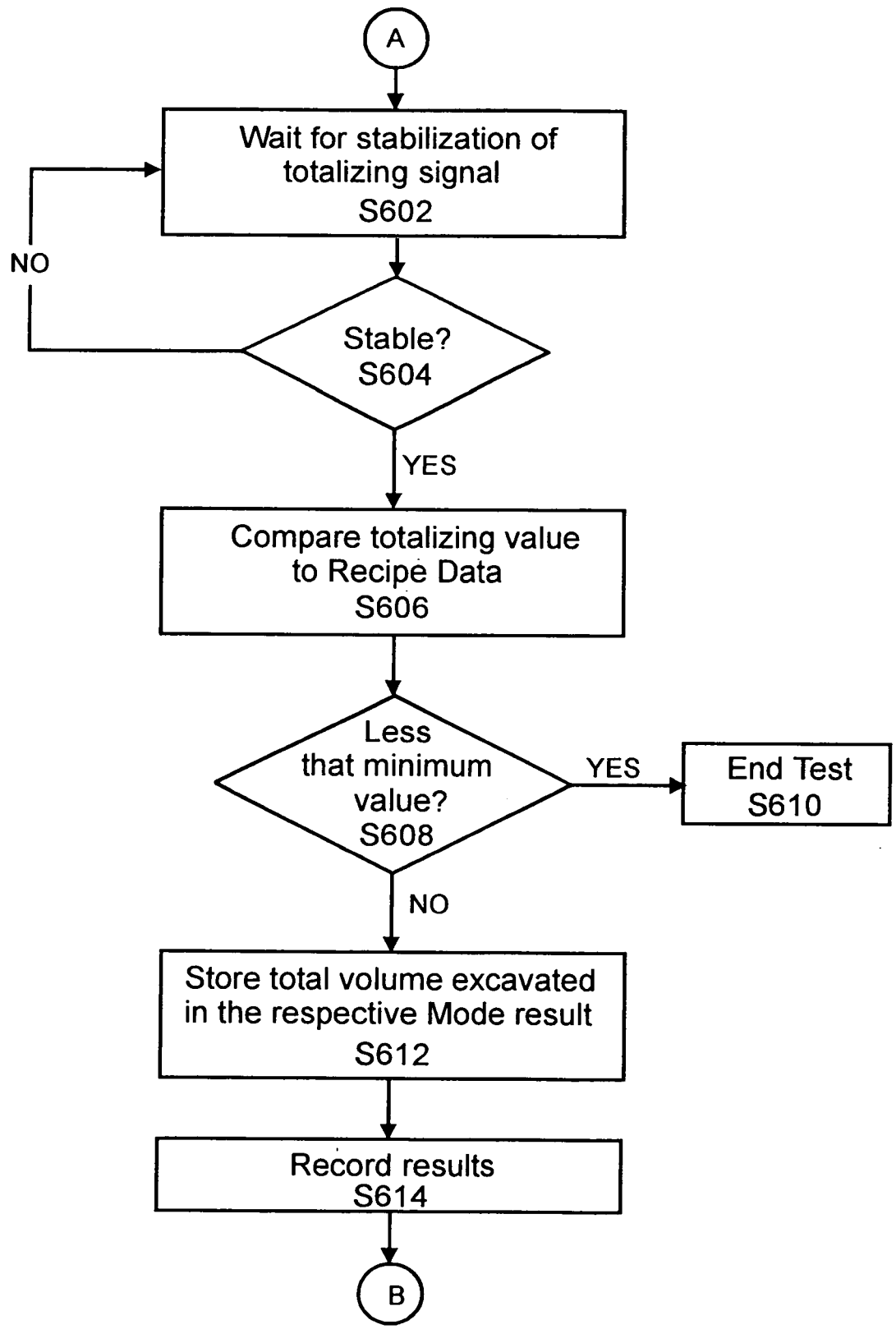
Figure 7:
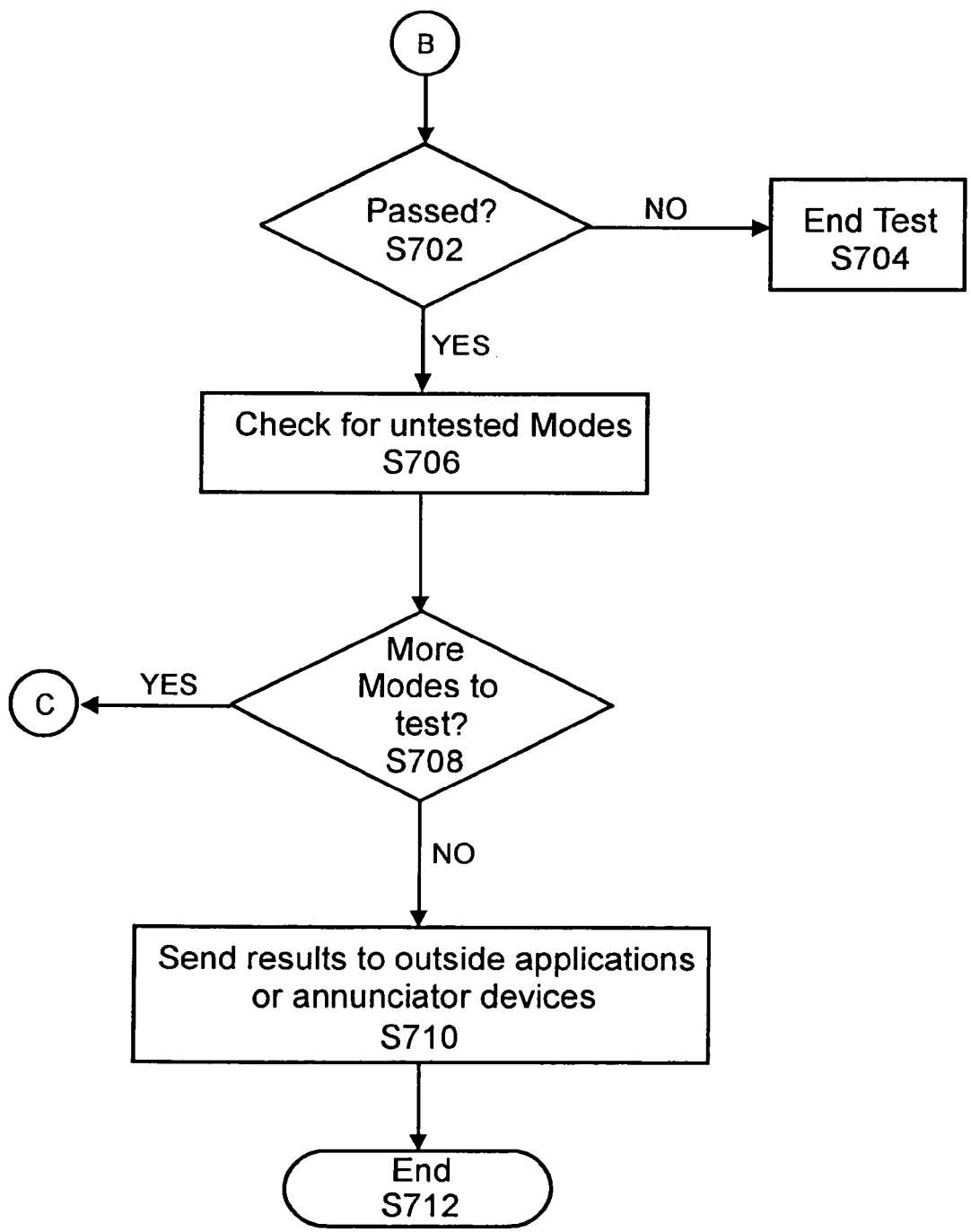

FIGS. 5–7 are flow charts illustrating an example test head testing sequence according to the present invention.

1. The Start Test signal is generated via pushbutton or a User Input (UI). S502
2. Upon discovery of the connection, the TMC will send the appropriate Recipe data to the respective Test Head Memory Space. S504
3. The EVPR set point is set to a minimum value to prevent overloading of the MFM. S524
4. The HSTM is reset to zero (0). S506
5. The HSTM is set to begin Totalizing media. S506
6. The SCV is turned on enabling media flow. S508
7. The EVPR set point is ramped up to the Testing Level at a ramp rate that prevents overloading of the MFM. S510
8. While Totalizing, compare the live Totalizing data to the Recipe Data [Max Value] and either continue or end the Test if it is exceeded (report a Failure). S512, S514, S516, and S518
9. Wait for the stabilization of the Totalizing signal, indicating the cavity has stabilized. S602, S604
10. Compare the Totalized value to the Recipe Data [Min Value] and end the Test if it is less than the Min Value. S606, S608, and S610
11. If the Totalizer value is not less than the threshold, Store the Total Volume Evacuated in the respective mode result. S612
12. Record the results. S614
13. If passed, check for untested modes S702, S706 if not passed, end test S704
14. If more modes are necessary go to step 4. S708
15. Send Test results to outside applications or local annunciation devices and end process. S710, S712

Figure 8:
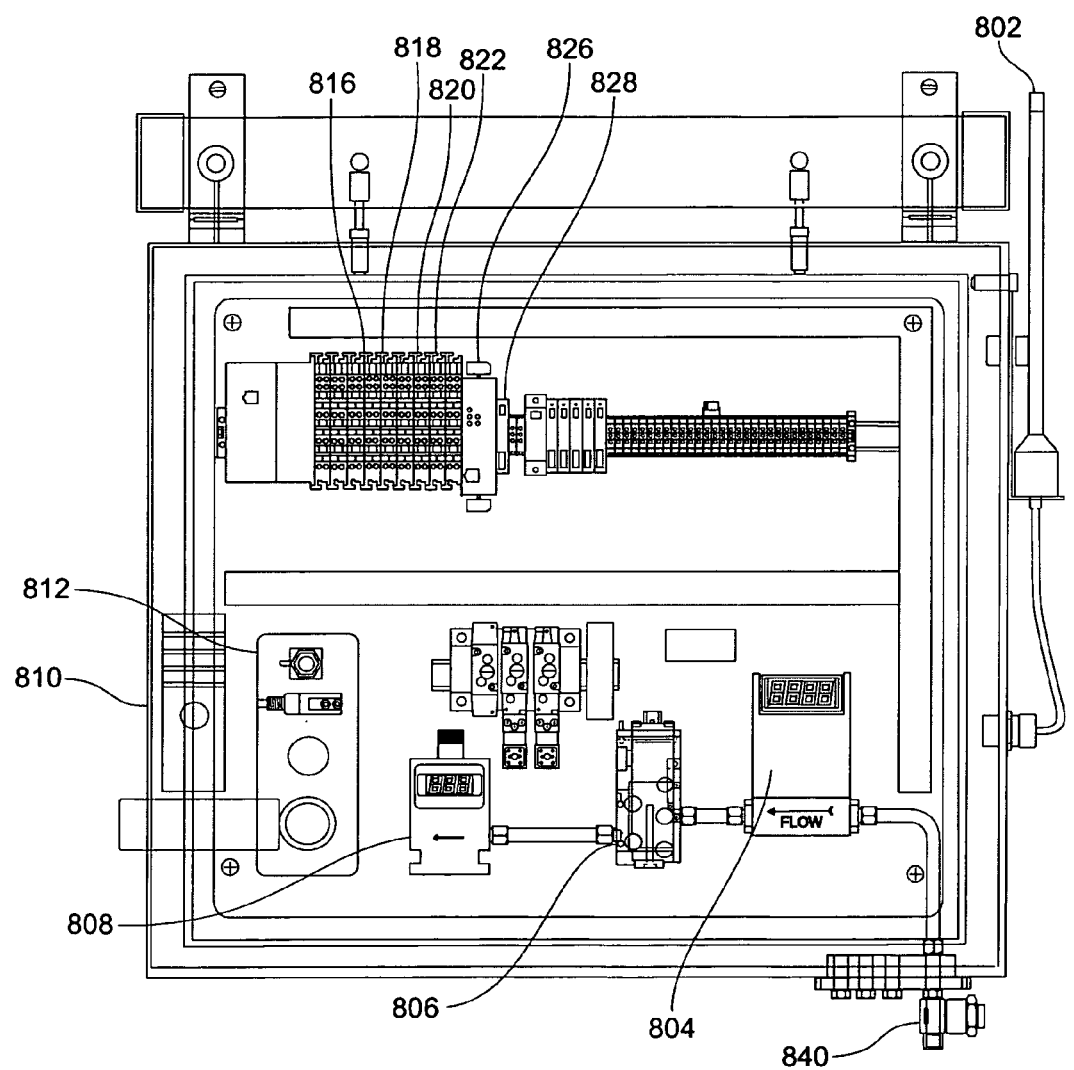
FIG. 8 is an example illustrating an example test head assembly according to the present invention.

Turning now to FIG. 8, FIG. 8 depicts an exemplary embodiment of a test head according to the present invention. Coupler 840 is connected to mass flow meter 804 and thence to solenoid 806. Fluid is transferred from solenoid 806 to electronic vacuum regulator 808. As shown in FIG. 8, the exemplary test head further includes vacuum pump 812. The test head depicted in FIG. 8 further includes antenna 802 and Ethernet modem 810 as well as Ethernet TCP/IP field bus coupler 816 which are used for communications. The exemplary embodiment of the test head further includes high speed counter module 818, two channel analog input module 820, two channel analog output module 822, four channel digital output module 826, and frequency output transmitter 828.

Figure 9:
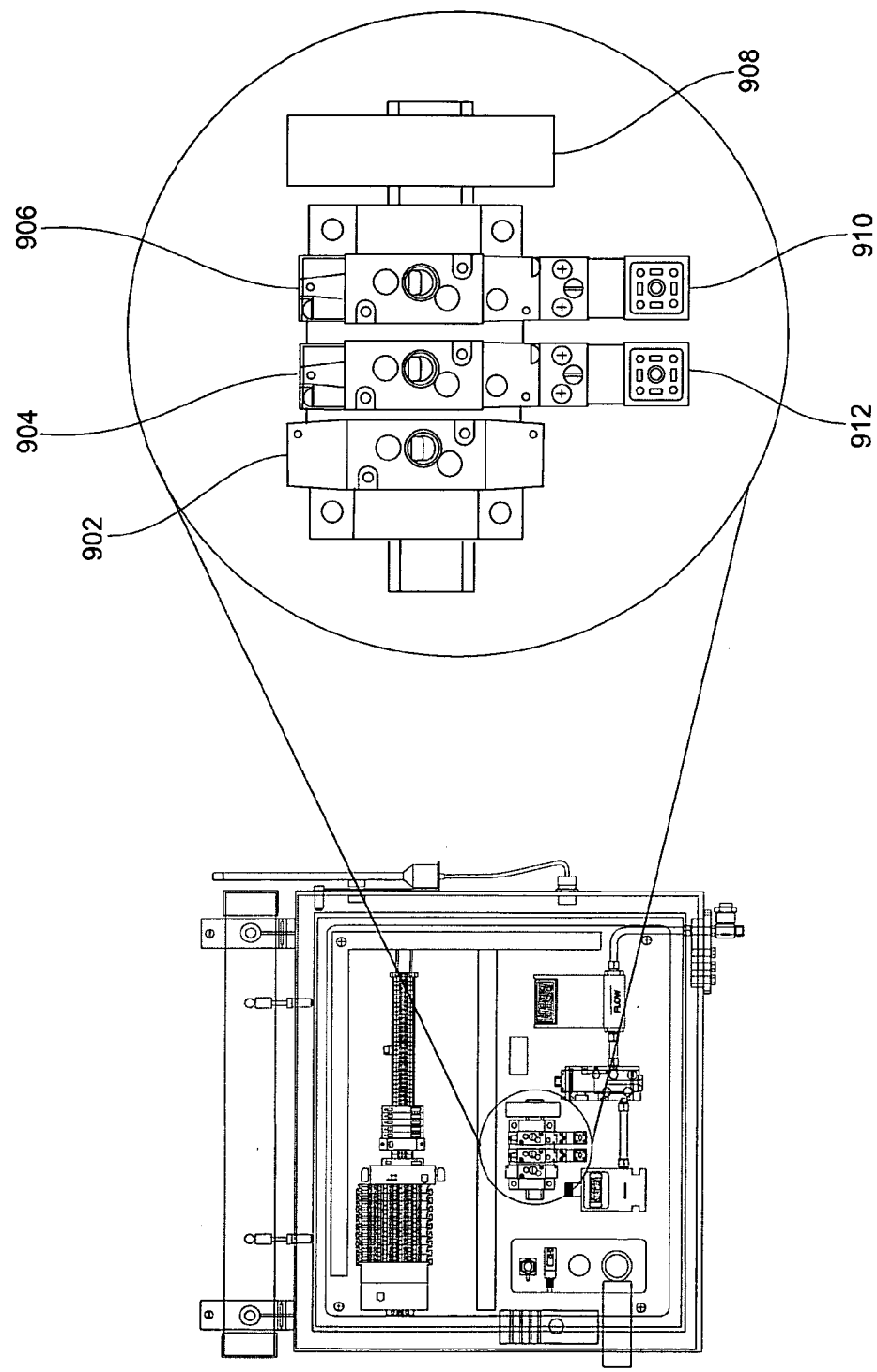
FIG. 9 is a blocked diagram illustrating an example test head assembly according to the present invention.

Turning now to FIG. 9, FIG. 9 depicts an exemplary embodiment of a test head as depicted in FIG. 8, but showing greater detail. FIG. 9 depicts the following components on the test head: double remote pilot solenoid valve 902, single solenoids 904 and 906, electrical connectors 912 and 910, and telpneumatic pressure switch 908.

Referring now to FIGS. 10–17, FIGS. 10–17 depict another exemplary process flow according to the present invention. Throughout FIGS. 10–17, process states are associated with reference numbers corresponding to exemplary computer program code disclosed in the appendix to the present application.

Figure 10:
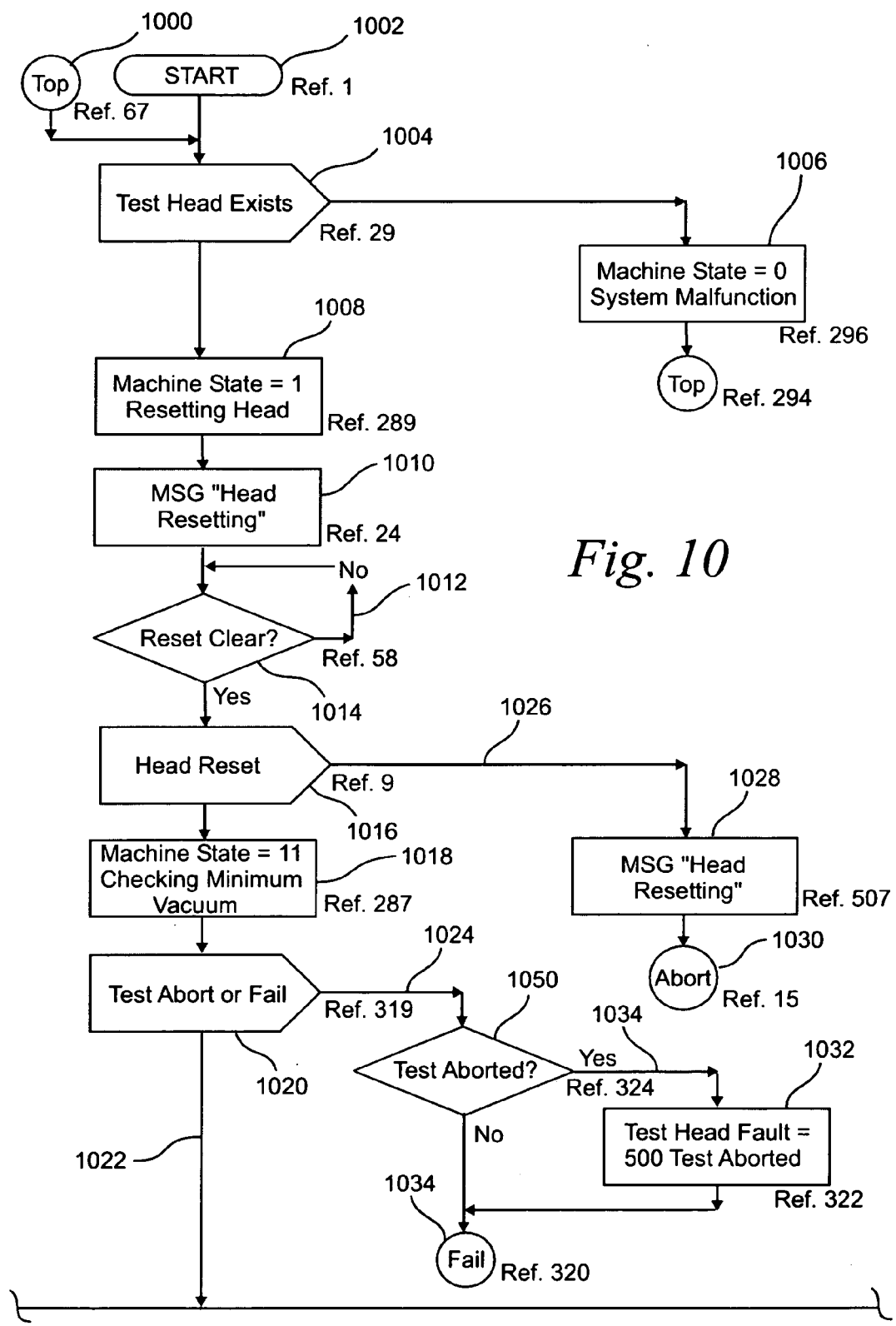
FIGS. 10–17 are flowcharts illustrating an exemplary process flow according to the present invention.

Referring now to FIG. 10, the exemplary process flow begins at state 1002 and proceeds to state 1004 where a determination is made as to whether a test head exists that is capable of executing the exemplary process flow. If a test head does not exist, process flow proceeds to state 1006 where the machine state is set equal to zero, indicating a system malfunction. If a test head does exist, then process flow proceeds to state 1008 where the machine state is set to 1, corresponding to the "reset" state (resetting the test head). A corresponding message is output in state 1010. In state 1014, a determination is made as to whether the "reset" state has been cleared, and the process state remains in state 1014 until the "reset" state has been cleared via return path 1012. When the "reset" state has been cleared, processing proceeds to state 1016, corresponding to a "head reset" state, and then to state 1018, where the machine state is set to 11 and the minimum vacuum measurement is made. Processing then proceeds to state 1020 where a determination is made if the test should be aborted or if the test has failed because a minimum vacuum value has not been reached. If the test fails, processing proceeds via control path 1024 to state 1050 where a further determination is made if the test has been aborted or if the test has failed. If the test has been aborted, processing proceeds to state 1032 where the parameter "test head fault" is set equal to 500.

Figure 11:
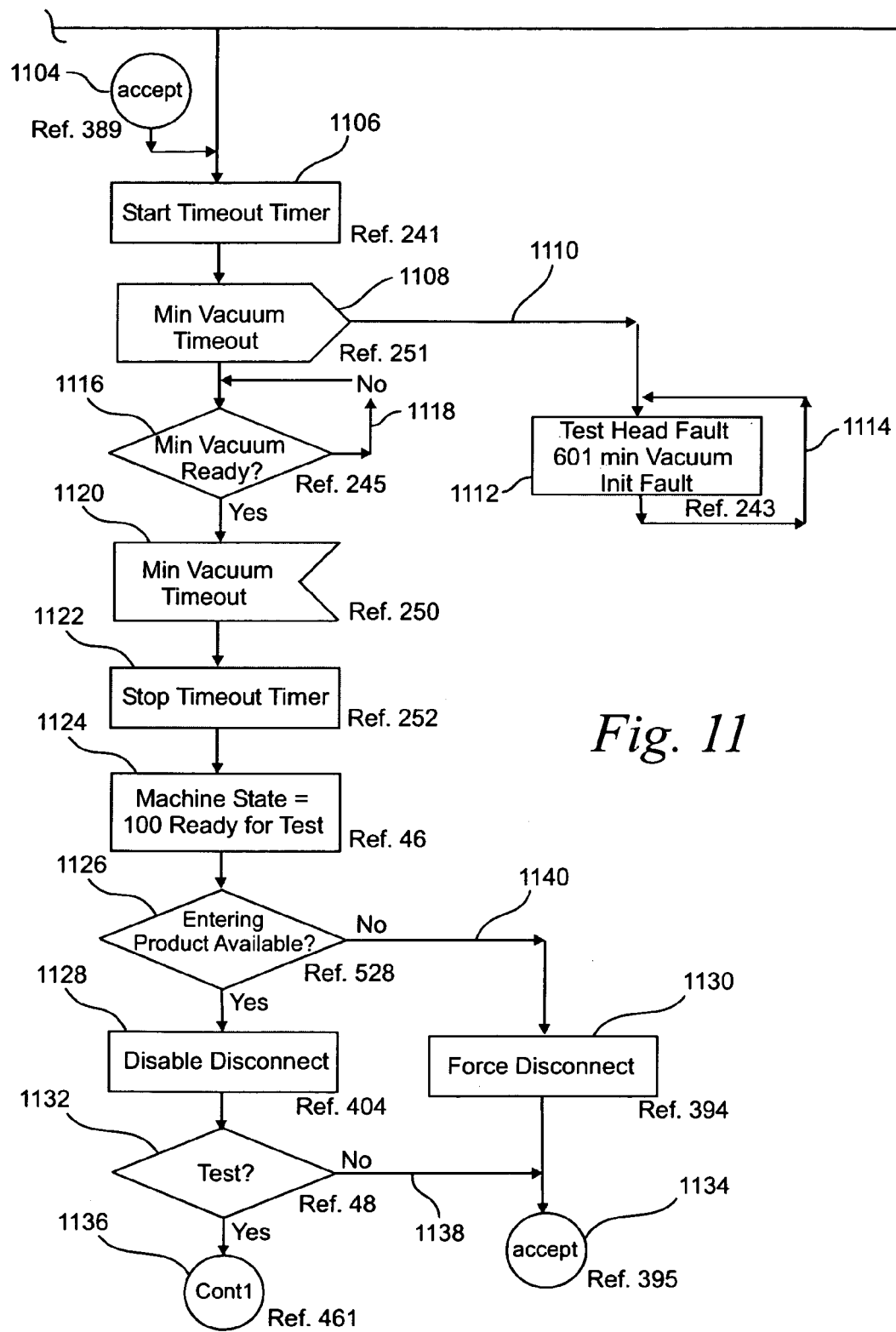

Referring now to FIG. 11, if the test has not aborted or failed, processing proceeds from state 1020 via control path 1022 and 1102 to state 1106 in which a time out timer is started. Processing proceeds to state 1108 which is the "minimum vacuum time out" state. Processing proceeds via control path 1110 if an initialization fault for the minimum vacuum is detected, and in state 1112, the parameter test head fault is set to the value 601. Processing will remain in state 1116 until a minimum vacuum value is attained. When a minimum vacuum value has been attained, processing proceeds to state 1120 and then to state 1120 where the time out timer started in state 1106 is stopped. Processing proceeds to state 1124 in which the machine state is set to "100," indicating that the test head is ready for test. Processing proceeds to state 1126 where a determination is made if an entering product is available. If a determination is made that a entering product is not available, processing proceeds via control path 1140 to state 1130 in which a disconnect is forced. If an entering product is available, processing proceeds to state 1128 in which the disconnect function is disabled. Processing proceeds to state 1132 where a determination is made if the test should continue.

Figure 12:
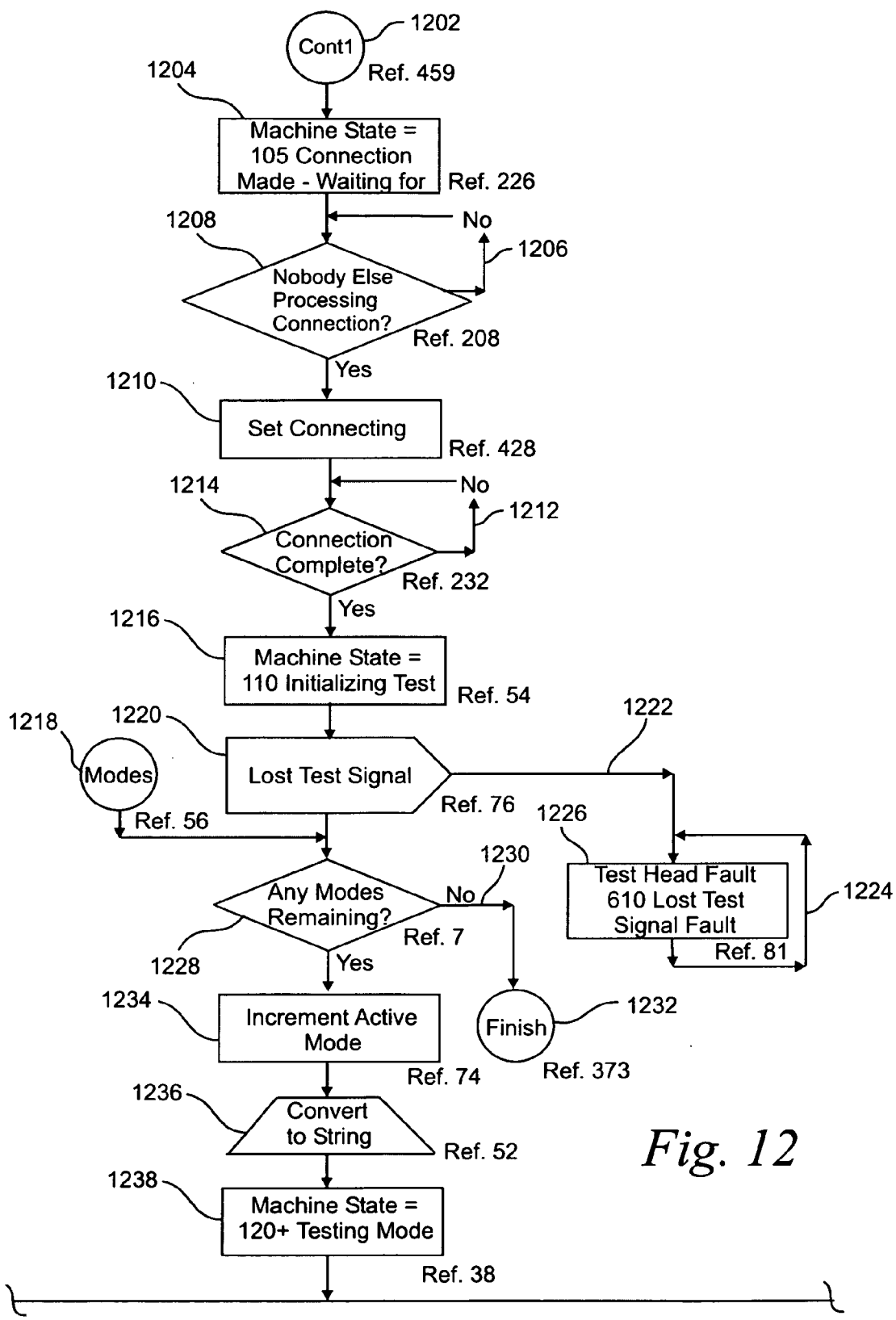

Referring now to FIG. 12, if the test is to continue, processing proceeds via states 1136 and 1202 to state 1204 in which the machine state is set to 105, indicating that a connection has been made. In state 1208, a determination is made as to whether any other entity is presently using the connection, and processing remains in state 1208 until no other entity is using the connection. Processing then proceeds to state 1210, which is the "connecting" state. Processing proceeds to state 1214 where a determination is made if the connection is complete, and processing remains in this state until a complete connection is made. When a connection has been completed, processing proceeds to state 1216 where the machine state is set to 110, corresponding to the "initializing test" state.

Processing proceeds to state 1120 where a determination is made as to whether a test signal is being properly received, and processing proceeds to state 1226 if the test signal has been lost. In state 1228, a determination is made as to whether any test modes remain that require further processing. If no test modes remain that require further processing, processing proceeds via control path 1230 to state 1232, corresponding to the "test finished" state. If test modes remain, processing proceeds to state 1234 where the active mode is incremented. In state 1236 the present active mode is converted into a string, and processing proceeds to state 1238 where the machine state is set to the value of 120 plus the value of the testing mode.

Figure 13:
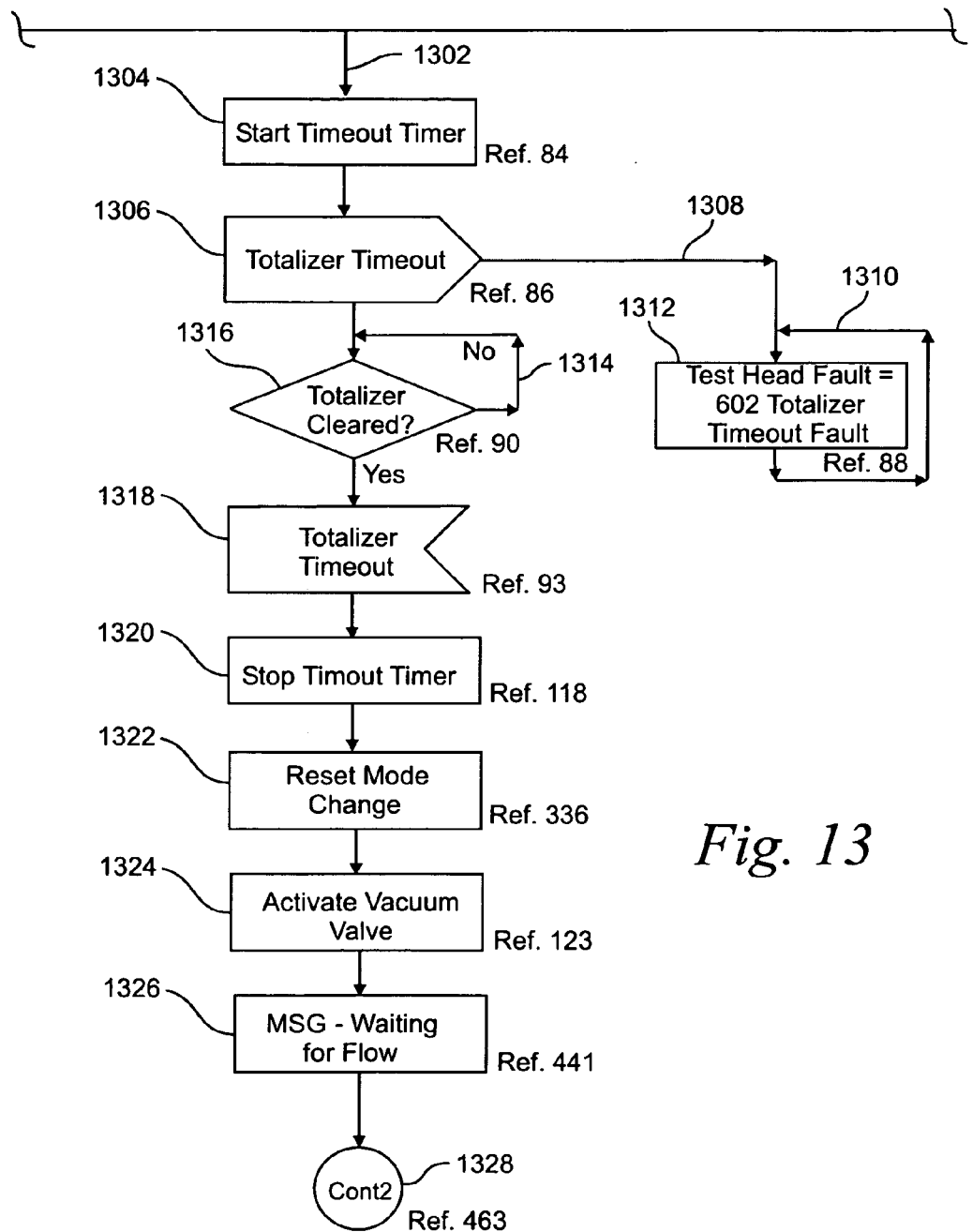

Turning now to FIG. 13, processing proceeds via control path 1302 to state 1304 where a time out timer is started. If a totalizer time out occurs in state 1306, processing via control path 1308 to state 1312 in which the test head fault parameter is set to the value of 602, indicating that the totalizer time out counter has failed to reset. Processing proceeds from state 1306 to state 1316 where a determination is made if the totalizer has been cleared, and processing remains in state 1316 until the totalizer has cleared. When the totalizer has cleared, processing proceeds to state 1318 and then to state 1320 in which the time out timer is stopped. Processing proceeds to state 1322 in which the mode change is reset. Processing proceeds to state 1324 in which the vacuum valve is activated, and then to state 1326 in which the message "waiting for flow" is generated.

Figure 14:
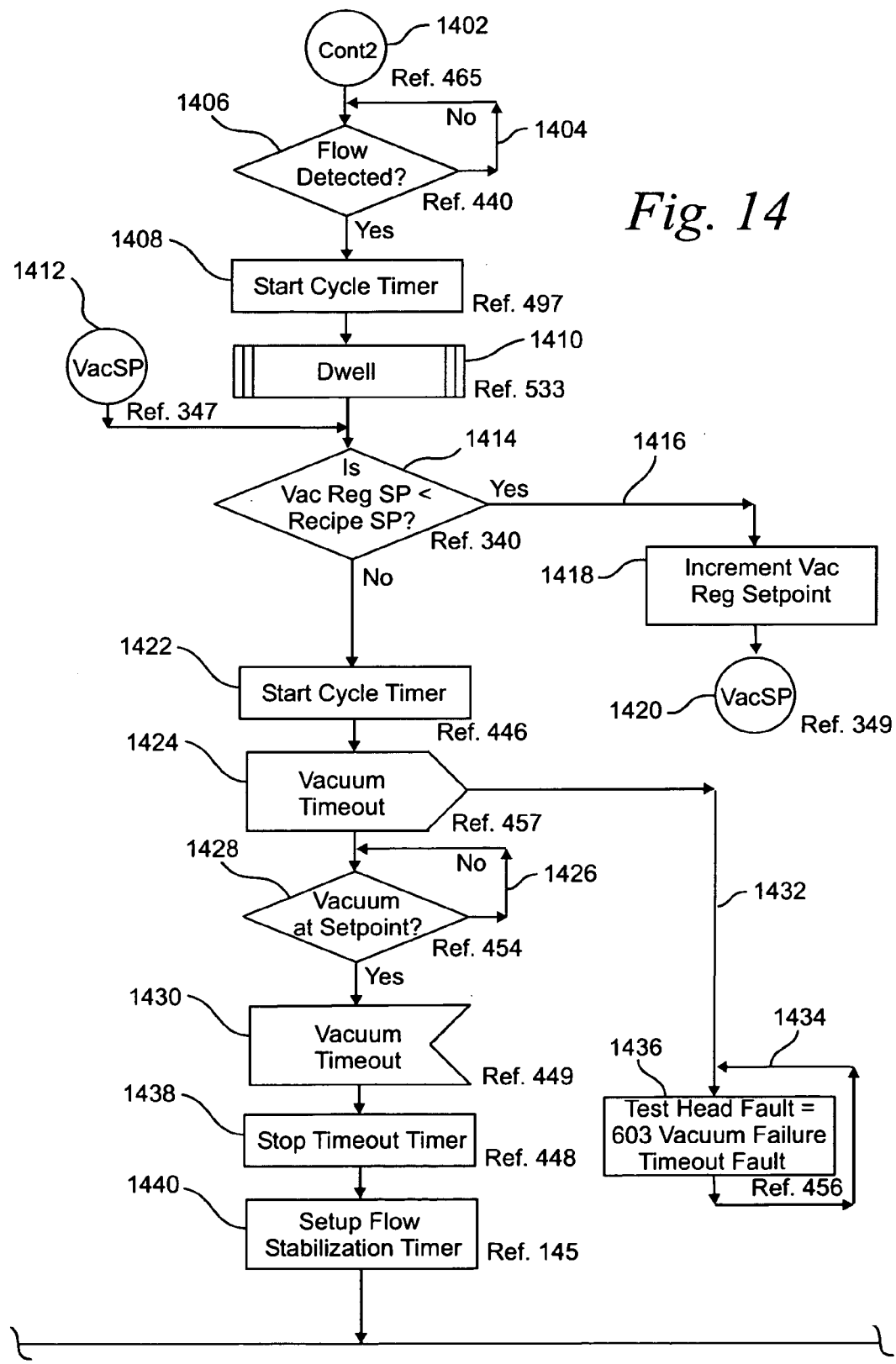

Referring now to FIG. 14, processing proceeds to state 1406 and remains in state 1406 until fluid flow is detected. When fluid flow is detected, processing proceeds to state 1408 where a cycle timer is started, and then proceeds to state 1410. From dwell state 1410 processing proceeds to state 1414 in which a determination is made as to whether the vacuum register set point is less than the recipe set point. If the vacuum register set point is determined to be less than the recipe set point, processing proceeds via control path 1416 to state 1418 in which the vacuum register set point is incremented, and control passes via control path 1420 and 1412 to state 1414. If it is determined in state 1414 that the vacuum register set point is not less than the recipe set point, then control passes to state 1422 in which a time out timer is started. In state 1424, if it is determined that the time out timer does not function, control passes to state 1436 in which the "test head fault" parameter is set to 603 indicating a "vacuum failure time out" fault. Control passes from state 1424 to state 1428 if the time out timer is successfully started, and remains in state 1428 until it has been determined that the vacuum is at the set point. When the vacuum reaches the set point, processing proceeds to state 1430 and to state 1438 where the time out timer is stopped. Processing proceeds to state 1440 in which the set up flow stabilization timer is started.

Figure 15:
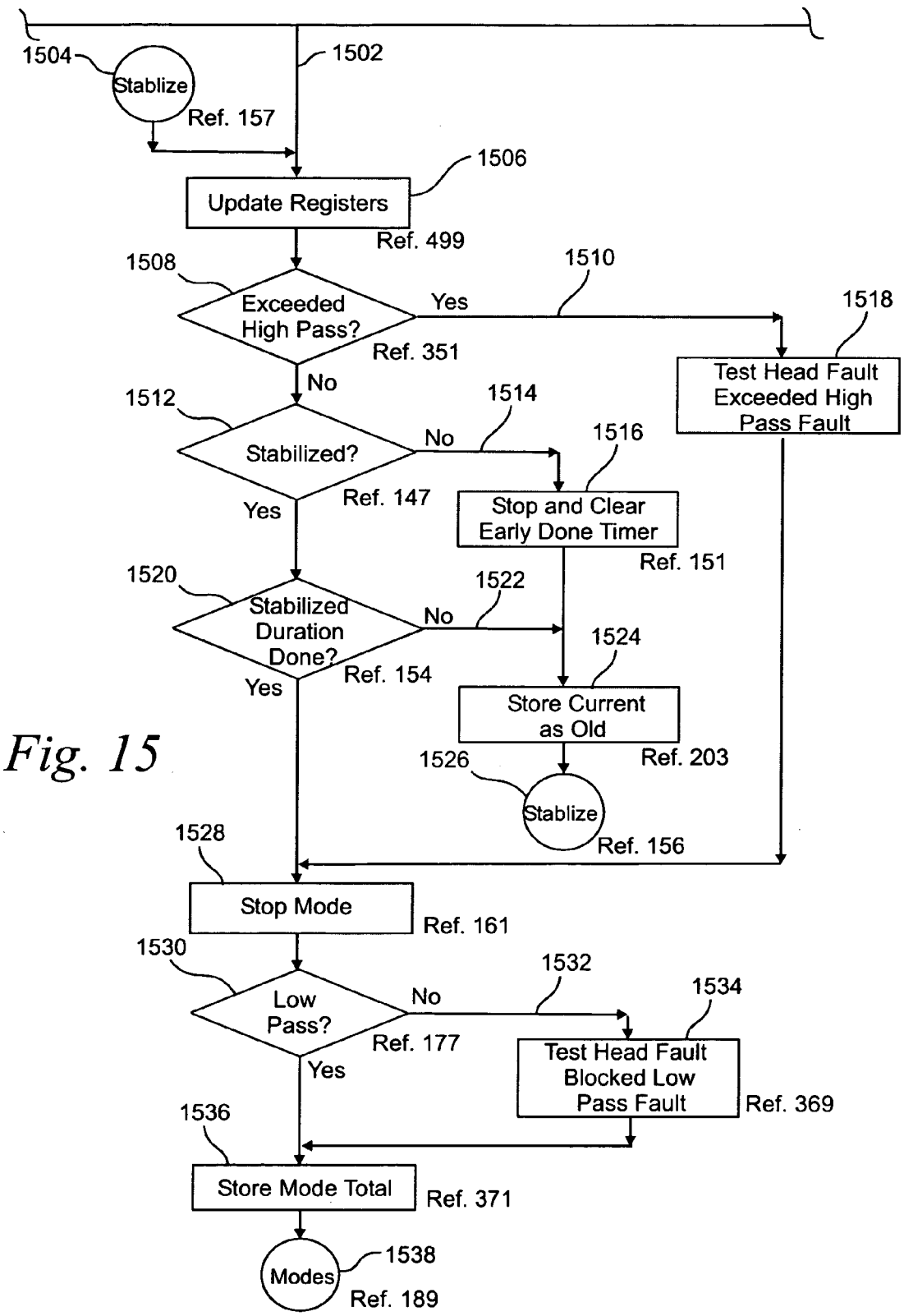

Turning now to FIG. 15, processing proceeds to state 1506 in which test head registers are updated. Processing proceeds to state 1508 in which a determination is made as to whether the test measurement has exceeded the high pass value. If the test measurement has exceeded the high pass value, processing proceeds via control path 1510 to state 1518 corresponding to a test head fault state "exceeded high pass fault." Processing proceeds from state 1518 to state 1528 which is the "stop mode" state. If it is determined in state 1508 that the test measurement has not exceeded the high pass value, processing proceeds to state 1512 in which a determination is made if the test measurement has stabilized. If it is determined that the test measurement has not stabilized, control passes via control path 1514 to state 1516 in which the early done timer is stopped and cleared. Processing proceeds from state 1516 to state 1524 in which the current measurement value is stored as the old measurement value, and processing proceeds via control path 1526 and 1504 to state 1506. If in state 1512 it is determined that the test measurement value has stabilized, processing proceeds to state 1520 where a determination is made as to whether the stabilized time duration period has been completed. If the stabilized time duration period has not been completed, processing proceeds via control path 1520 to state 1524. If in state 1520 it is determined that the stabilized time duration period has been completed, processing proceeds to state 1528 corresponding to the "stop mode" state. Processing proceeds to state 1530 in which a determination is made as to whether the test measurement is less than the low pass value. If it is determined in state 1530 that the test measurement does not exceed the low pass value, processing proceeds to state 1534 corresponding to the test head fault "blocked low pass fault" state. Processing proceeds from state 1534 to state 1536. If it is determined in state 1530 that the test measurement exceeds or equals the low pass value, processing proceeds to state 1536 in which the mode total for the test measurement is stored. Control then passes via control path 1538 and 1218 to state 1228.

Figure 16:
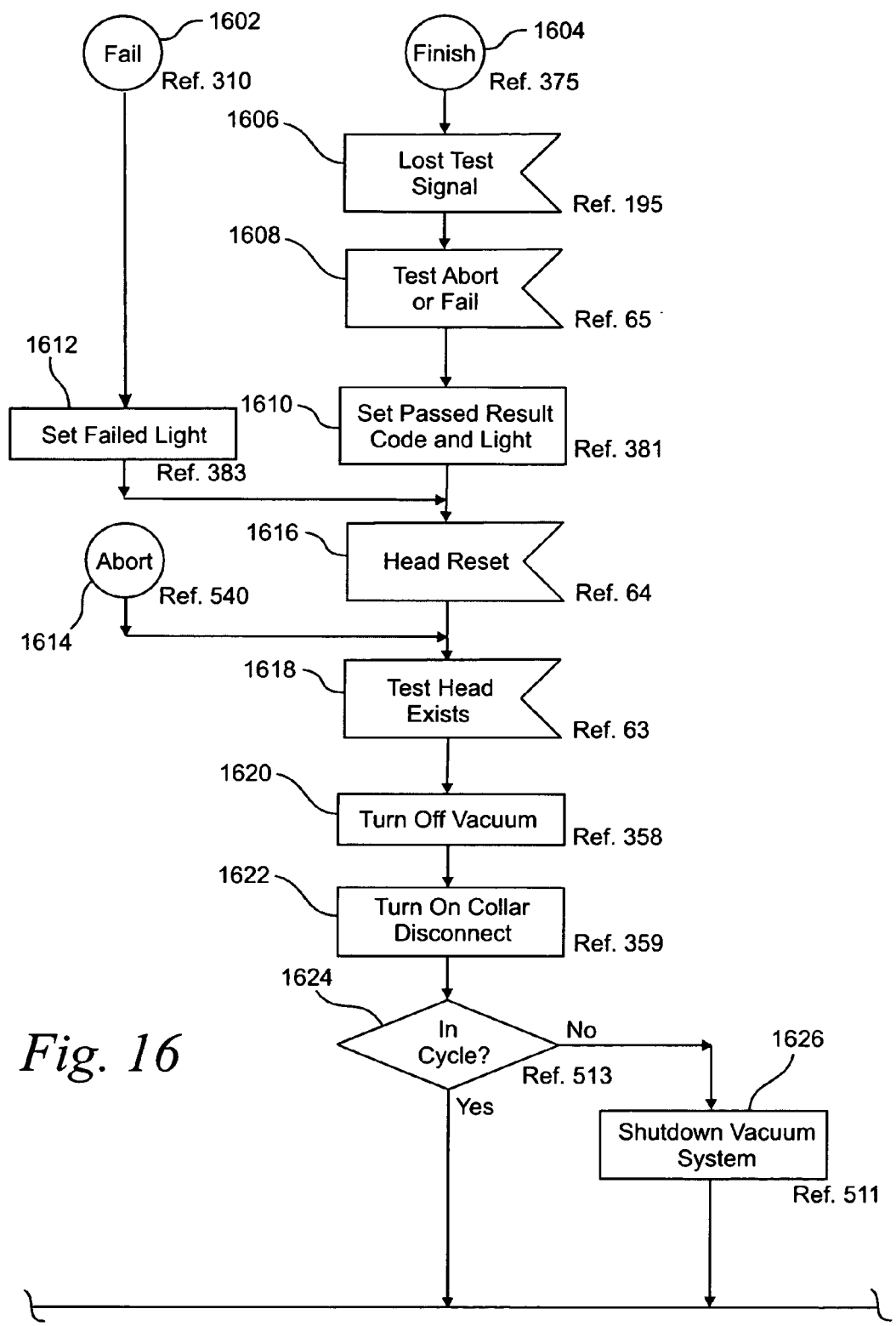

Referring now to FIG. 16, processing proceeds via fail control path 1602 to state 1612 in which the "failed" light is set, and processing proceeds to state 1616. Processing proceeds via control path 1604 to state 1606 and then to state 1608. In processing state 1610, the "past" result code and light are set. Processing proceeds to state 1616 and then to state 1618 and state 1620. In state 1620, the test vacuum is turned off. Processing proceeds to state 1622 in which the "collar disconnect" signal is turned on. Processing proceeds to state 1624 in which a determination is made if a test cycle is in progress. If it is determined that a test cycle is not in progress, processing proceeds to state 1626 in which the vacuum system is shut down.

Figure 17:
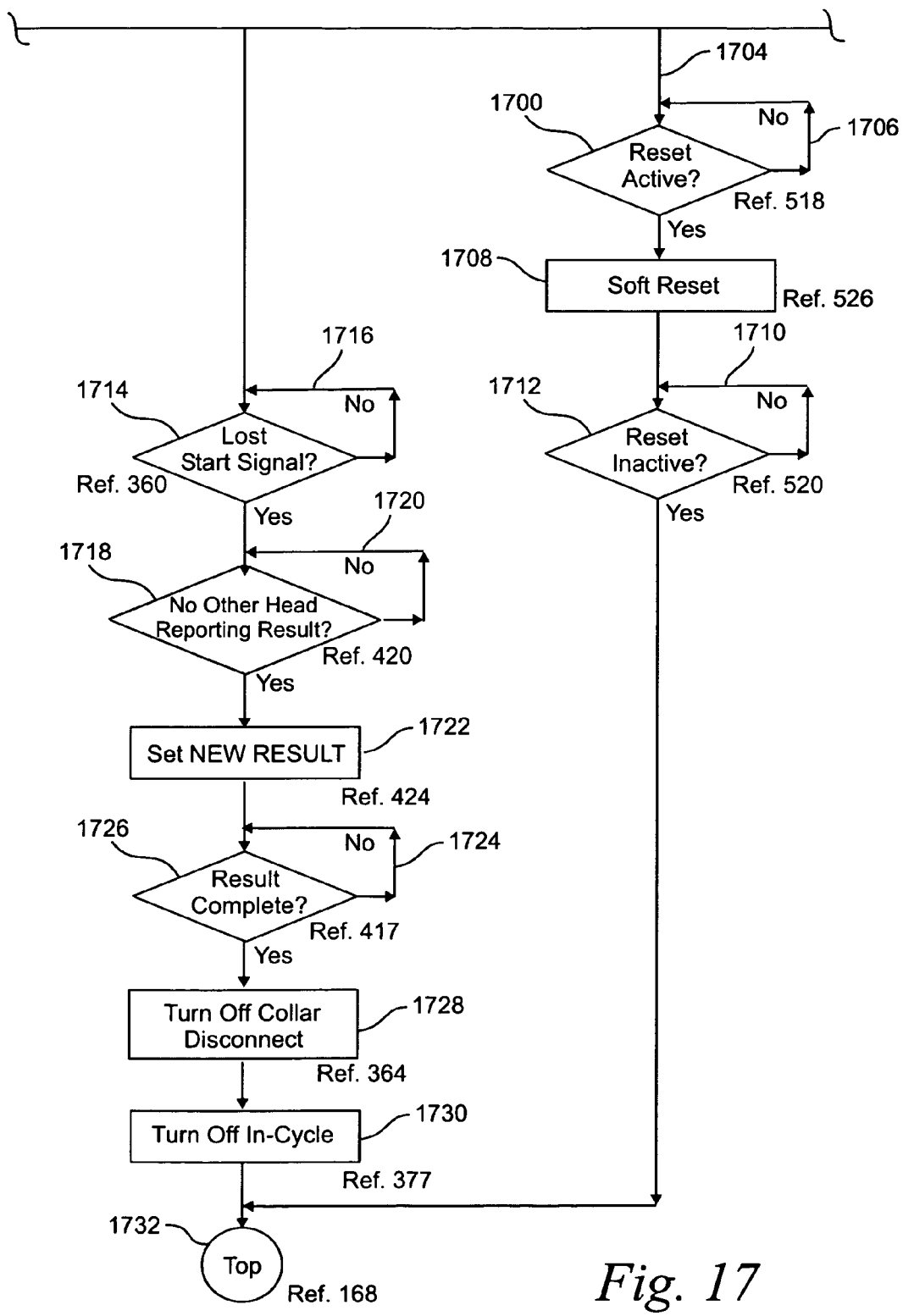

Referring now to FIG. 17, if it is determined in state 1624 that a test cycle is in progress, processing proceeds via control path 1712 to state 1714. If it is determined in state 1624 that a test cycle is not in progress, processing proceeds via state 1626 and control path 1704 to state 1700. In state 1700, a determination is made if a reset is active and processing remains in state 1700 until a reset becomes active. When it is determined that a reset is active, control passes to state 1708, corresponding to the "soft reset" state and processing proceeds to state 1712. Processing remains in state 1712 until a determination is made that the reset is inactive. Processing then proceeds via control path 1732 and 1000 to state 1004.

Processing remains in state 1714 until it is determined that the "start" signal has been lost. Processing then proceeds to state 1718. Processing remains in state 1718 until it is determined that no other test head is reporting results. Processing then proceeds to state 1722 in which the new result is set, and processing proceeds to state 1726. Processing remains in state 1726 until it is determined that the result is complete. Processing then proceeds to state 1728 in which the "collar disconnect" signal is turned off. Processing then proceeds to state 1730 in which the "in-cycle" signal is turned off. Processing then proceeds via control path 1732 and control path 1000 to state 1004.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise then as specifically described herein.

What is claimed is:

1. A mobile test apparatus, comprising:
a mass flow measuring device, a high speed totalizer connected to said mass flow measuring device, and a software-based controller mechanically connected to the mobile test apparatus, wherein the mass flow measuring device is configured to measure gaseous media mass flow and to produce gaseous mass flow signals, wherein the high speed totalizer is configured to totalize said gaseous mass flow signals, and wherein the software-based controller is configured to control at least said mass flow measuring device and said high speed totalizer, and to communicate with a remote central control apparatus.

2. The mobile test apparatus recited in claim 1, wherein said software-based controller is configured to communicate using at least one of wireless, fiberoptic, and wire communications.

3. The mobile test apparatus recited in claim 1, wherein said software-based controller is configured to store a plurality of test results for subsequent transmission.

4. The mobile test apparatus recited in claim 1, further comprising a high speed voltage to frequency converter connecting said mass flow measuring device and said high speed totalizer, and configured to convert said gaseous mass flow signals to gaseous mass flow frequency signals.

5. The mobile test apparatus recited in claim 1, further comprising a vacuum pressure regulator coupled to said mass flow measuring device.

6. A mobile test apparatus, comprising:
means for measuring gaseous media mass flow and for producing gaseous mass flow data signals;
means for converting said gaseous mass data signals to mass flow frequency signals;
means for high speed totalizing of said gaseous mass flow frequency signals;
means for controlling at least said means for measuring gaseous mass flow, said means for converting, and said means for high speed totalizing,
wherein said means for controlling is configured to communicate with a test management console using wireless communications.

7. A test method for concurrently testing mobile devices, comprising steps of:
measuring a mass flow of gaseous media mass flow at the mobile device;
producing gaseous mass flow signals based on the measured mass flow at the mobile device; and
totalizing said plurality of gaseous mass flow signals at the mobile device, wherein the step of totalizing is performed by a high speed totalizer controlled by a software-based controller in communication with a remote central control apparatus.

8. The method recited in claim 7, further comprising controlling with a software-based controller at the mobile device at least one of said measuring step, said producing step, and said totalizing step; and communicating with a remote control device.

9. The method recited in claim 7, further comprising storing a plurality of test results for subsequent transmission.

10. The method recited in claim 7, wherein said devices include pressure cavities.

* * * * *